United States Patent [19]
Borel et al.

[11] 4,031,529
[45] June 21, 1977

[54] THERMAL METHOD FOR CONTROLLING THE OPTICAL PROPERTIES OF A LIQUID CRYSTAL AND DEVICES FOR THE APPLICATION OF SAID METHOD

[75] Inventors: Joseph Borel, Echirolles; Jacques Robert, St-Egreve, both of France

[73] Assignee: Commissariat a l'Energie Atomique, Paris, France

[22] Filed: Dec. 22, 1975

[21] Appl. No.: 643,144

[30] Foreign Application Priority Data
Dec. 24, 1974 France .................. 74.42766

[52] U.S. Cl. .................. 340/324 R; 250/331; 350/160 LC
[51] Int. Cl.² .................. G02F 1/13
[58] Field of Search .......... 340/324 R, 324 M, 336; 350/160 LC; 250/331, 474

[56] References Cited
UNITED STATES PATENTS

| 3,650,608 | 3/1972 | Baker | 350/160 LC |
|---|---|---|---|
| 3,711,713 | 1/1973 | Wysocki et al. | 350/160 LC |
| 3,796,999 | 3/1974 | Kahn | 350/160 LC |
| 3,829,684 | 8/1974 | Assouline et al. | 350/160 LC |
| 3,857,629 | 12/1974 | Freiser | 350/160 LC |
| 3,921,162 | 11/1975 | Fukai et al. | 340/324 M |
| 3,956,169 | 5/1976 | Nakano et al. | 350/160 LC |

Primary Examiner—David L. Trafton
Attorney, Agent, or Firm—Cameron, Kerkam, Sutton, Stowell & Stowell

[57] ABSTRACT

In a liquid crystal whose molecules have temperature-dependent dielectric anisotropy within a range such that the liquid crystal retains the same phase, the optical properties of a liquid crystal film are controlled by applying an electric field of predetermined frequency to the film and by bringing the temperature of the film to a value within the range mentioned. The dielectric anisotropy then assumes a predetermined value in respect of said frequency and the liquid crystal film assumes a predetermined optical state.

17 Claims, 11 Drawing Figures

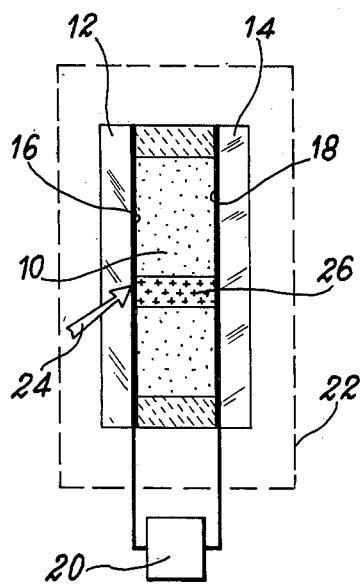
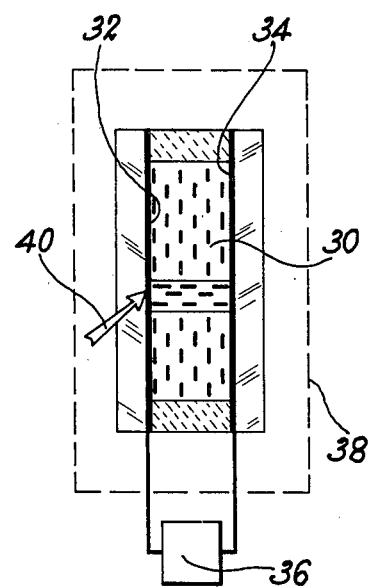
FIG. 3     FIG. 4
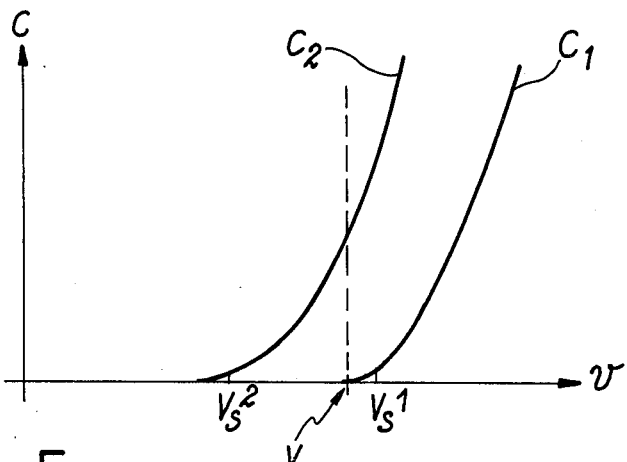
FIG. 5

THERMAL METHOD FOR CONTROLLING THE OPTICAL PROPERTIES OF A LIQUID CRYSTAL AND DEVICES FOR THE APPLICATION OF SAID METHOD

This invention relates to a thermal method for controlling the optical properties of a liquid crystal and to devices for carrying out said method. The invention finds an application in the field of optoelectronics and especially in the display of alphanumeric characters, for example.

Methods of the thermal type for controlling the optical properties of a liquid crystal are already known. In the article entitled "Thermally addressed electrically erased high-resolution liquid-crystal light valves" by H. Melchior et al., published in "Applied Physics Letters", volume 21, No 8 of Oct. 15th, 1972, there is described a device in which an infrared light beam is employed for locally heating a cholesteric liquid crystal film. Local heating followed by cooling to the initial temperature creates lightscattering centers which subsequently persist and can be erased electrically. Methods and devices of this type are based on the fact that the molecular arrangement which is characteristic of the cholesteric type can be destroyed by a sufficient rise in temperature which causes a transition of the liquid crystal to the isotropic phase. At the time of cooling, the liquid crystal assumes a disordered cholesteric structure. The zones of the liquid crystal which are in this disordered state have a light-scattering effect and the zones which have retained the ordered cholesteric arrangement remain transparent.

In another article entitled "IR-laser-addressed thermo-optic smectic liquid crystal storage displays" by F. J. Kahn published in "Applied Physics Letters", volume 22, No 3, Feb. 1st, 1973, there is described another liquidcrystal display device controlled by a thermal process. In this case also, the temperature rise is sufficient to ensure that the initial ordered molecular arrangement which is characteristic of the smectic phase is destroyed by transition to the isotropic phase and cooling is sufficiently rapid to result in the appearance of a disordered arrangement which has a light-scattering effect.

In consequence, consideration is again given in this instance to a method and a device which are based on a transition from an ordered state of the molecules to a static disordered state by means of a phase change.

These two methods therefore make it possible to give the liquid crystal only two distinct optical states and can therefore be employed only in devices of the "digital" type.

This invention is concerned with a method for controlling the optical properties of a liquid crystal which is also carried out by means of an operation for producing a temperature rise but which, in contrast to the methods of the prior art, is not based on a phase change of a liquid crystal involving transition to an isotropic state and permits continuous variation of the optical properties of said liquid crystal. In accordance with the invention, the supply of thermal energy which induces a temperature rise of the liquid crystal modifies the value of dielectric anisotropy of the molecules of said crystal without resulting in a change of phase.

It is known that the liquid crystal molecules usually possess a permanent dipole moment and that the direction of this moment with respect to the axes of the molecule depends on the type of molecule. The dielectric constant $\epsilon_{\parallel}$ measured parallel to the long axis of the molecule is usually different from the constant $\epsilon_{\perp}$ measured parallel to the short axis of the molecule. The dielectric anisotropy $\Delta\epsilon$ of a liquid crystal is then determined both in magnitude and in sign by the difference $(\epsilon_{\parallel} - \epsilon_{\perp})$. In point of fact, the behavior of a liquid crystal under the action of an electric field is dependent on said anisotropy to a great extent in collective molecular orientation phenomena and to a lesser extent in dynamic light-scattering phenomena. By producing action on said anisotropy, it is therefore possible to modify the optical properties of a liquid crystal.

There are already known to exist in the prior art methods for controlling the optical properties of a liquid crystal which are based both on the phenomenon of collective orientation of molecules under the action of an electric field and on the possibility of modifying the dielectric anisotropy of the molecules. These methods are based on a phenomenon of relaxation of the dielectric constant $\epsilon_{\parallel}$ of certain liquid crystals, with the result that the dielectric anisotropy varies as a function of the frequency of the electric excitation field at constant temperature. Accordingly, by modifying said frequency, it is possible to obtain different values of anisotropy and consequently different optical states of the liquid crystal. In regard to this phenomenon of variation of dielectric constants and of anisotropy as a function of frequency at constant temperature, reference can also be made to the article entitled "relaxation of the dielectric constant and electro-hydrodynamic instabilities in a liquid crystal" by W. H. de Jeu et al, published in the "Physics Letters" review, volume 39A, No 5, of June 5th, 1972.

The results presented by W. H. de Jeu et al. at the fourth international conference on liquid crystals at Kent, Ohio, USA, August 21-25, 1972 in the communication entitled "Nematic Phenyl Benzoates in Electric Fields" Part I (due to be published in the Mol. Cryst. Liq. Cryst. review) and by W. H. de Jeu et al in the communication entitled "The influence of smectic order on the static dielectric permittivity of liquid crystals" — Journal of Chemical Physics, 61 — 1985 (1974) have served to show that the dielectric anisotropy of certain liquid crystals is dependent on the temperature in respect of a constant frequency of the electric excitation field. As mentioned in the articles cited, these variations result from two different mechanisms: the first takes place in the presence of an alternating electric field of predetermined frequency whilst the second does not entail the need for such a field. The researches undertaken by the present Applicant have served to demonstrate that these phenomena could be employed for controlling the optical state of a liquid crystal by producing action, not on the frequency at constant temperature, but on the temperature while preferably maintaining constant the frequency of the applied electric field, which offers many advantages.

An electric field which is preferably alternating and is the same as the electric field defined in the case of the first mechanism mentioned above is accordingly employed for the purpose of showing the variation in dielectric anisotropy by means of a variation in the optical properties of the liquid crystal film.

The present invention is therefore directed to a method for controlling the optical properties of a liquid crystal film in which the value of dielectric anisotropy of the liquid crystal molecules is modified in order to control the optical state of said crystal; the method is characterized in that:

there is chosen a liquid crystal in which said anisotropy depends on the temperature within a range in which the liquid crystal retains the same phase, an electric field of predetermined frequency is applied to the liquid crystal film, the temperature of the liquid crystal film is brought to a value located within said range, the dielectric anisotropy then assumes a predetermined value in respect of the value of said frequency and the liquid crystal film then assumes a predetermined optical state.

Most of the known phenomena which arise in liquid crystals under the action of an electric field can be utilized with the method according to the invention, especially the dynamic light-scattering effects (the dynamic scattering mode of operation known as DSM) and the collective molecular orientation effects such as, for example, collective rotation of the molecules of a nematic liquid crystal, transition from a twisted nematic structure to a homeotropic structure, transition from a cholesteric structure to a homeotropic structure and rotation of the planes of a cholesteric liquid crystal.

A method of this type for controlling the optical properties of a liquid crystal can constitute a method for the display of information when associated with means for erasing said information. In the majority of instances, it is only necessary to dispense with the supply of thermal energy in order to ensure that the anisotropy reverts to its initial value and that the liquid crystal returns to the optical state which it possessed prior to excitation. If so required, this erasing operation can be carried out by means of the action produced by an electric field of suitable frequency.

In comparison with the methods of the prior art and in particular with those which have recourse to a change of phase of the liquid crystal under the action of a temperature rise, the method according to the invention offers a large number of advantages. Among these can be mentioned by way of example the greater rapidity of control, the higher degree of sensitivity which makes it possible to obtain the desired effect with a lower thermal energy than in the methods of the prior art, the possibility of adjusting the decay time in order to obtain a memory effect or in order to reduce it, the possibility of employing all the known electro-optical effects in liquid crystals (in either coherent or non-coherent light), the possibility of varying the optical properties of a liquid crystal in analog form and in digital form as will become more clearly apparent in the following description.

The invention also relates to a liquid crystal device for the practical application of the method as hereinabove defined. Said device comprises a liquid crystal film interposed between a system of electrodes placed on two flat walls and means for varying the dielectric anisotropy of the liquid crystal molecules at least at predetermined points in order to cause said liquid crystal to assume at said points an optical state which is different from the initial state and characteristic of each point aforesaid; this device is characterized in that:

the liquid crystal employed is of the type in which the dielectric anisotropy at constant frequency is dependent on the temperature within a given range in which the liquid crystal retains the same phase, said means comprise:

a. an alternating-current voltage source of predetermined frequency which is connected to all the system of electrodes, b. means for bringing the temperature of said liquid crystal film to a initial value located within said range, the film subjected to said electric field being in that case in an initial optical state, c. means for selectively addressing at points of the liquid crystal film a predetermined thermal energy which is characteristic of each point aforesaid and increases the temperature of the liquid crystal at said points from said initial value to a second value which is characteristic of each point aforesaid, said points of the liquid crystal being then in a second optical state which is characteristic of each point aforesaid.

A number of alternaive embodiment of said device come within the scope of the invention, depending on whether the liquid crystal is capable of exhibiting the phenomenon of collective orientation or of dynamic scattering.

The device in accordance with the invention associated with means for addressing a thermal excitation to the different points of the liquid crystal film constitutes an imager.

The means aforesaid can be of any known type (for example local heating by Joule effect in a system of resistors defining the points to be excited) but are advantageously constituted by a light source which emits an infrared beam (a laser, for example) associated with means for deflecting the beam so as to permit of addressing at any point of the surface of the liquid crystal film.

The device hereinabove defined in general outline is an analog imager. A particularly important case is that of the digital imager; in this case, the liquid crystal film has a plurality of points which are controlled separately but capable of assuming two, and only two, optical states including the initial state, for example.

Furthermore, the invention includes the liquid crystal cells in which all the points are controlled simultaneously either in order to assume an optical state which varies continuously (analog light modulator, for example) or in order to assume two distinct optical states (light shutter, for example).

The characteristic features and advantages of the invention will in any case become more readily apparent from the following description of exemplified embodiments which are given by way of explanation and not in any sense by way of limitation, reference being made to the accompanying drawings, in which:

FIG. 3 is a schematic illustration of the device according to the invention;

FIG. 4 is an illustration of said device in the case in which the phenomenon employed is collective molecular orientation;

FIG. 5 shows the utilization of the presence of a variable threshold in the scattering effect;

Figure 1:
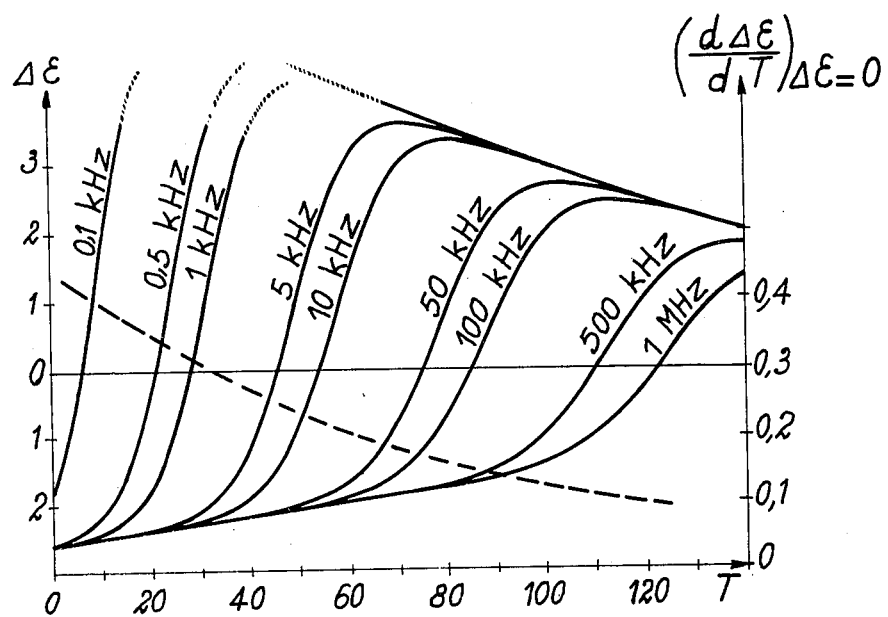
FIG. 1 shows the theoretical variations in dielectric anisotropy of a liquid crystal as a function of temperature, the frequency of the applied electric field being taken as a parameter.

In order to gain a better understanding of the invention which forms the subject of the present Application, a few theoretical results relating to the behavior of liquid crystals subjected to an electric field as a function of their temperature can first be recalled with reference to FIG. 1.

This figure represents the variations in dielectric anisotropy $\Delta\epsilon$ plotted as ordinates as a function of the temperature T which is plotted as abscissae and expressed in degrees centigrade, the frequency of the electric field applied to the liquid crystal being taken as a parameter. The dashed-line curve represents the temperature-dependent variations of the slope of gradient of the curves thus obtained in respect of the particular value corresponding to zero anisotropy.

These theoretical curves have been calculated by the present Applicant in the case of the eutectic mixture $B_1$ $B_2$ given by de Jeu et al. in the communication which was cited earlier. These curves are the translation of the relation which gives the dielectric anisotropy $\Delta\epsilon$ as a function of the angular frequency $\omega$ of the electric field applied to the liquid crystal and of the temperature T of this latter. This relation is of the form:

$$\Delta\epsilon = \epsilon_{//\infty} - \epsilon + \frac{\epsilon_{//s}\,\epsilon_{//\infty}}{1 + \omega^2 \tau^2}$$

wherein: $\tau = \frac{1}{2}\pi\, fr$, where $fr$ is the relaxation frequency, $\epsilon_{//\infty}$ is the value of $\epsilon_{//}$ in respect of a frequency of considerably higher value than $fr$, $\epsilon_{//s}$ is the value of $\epsilon_{//}$ in respect of a frequency of considerably lower value than $fr$, $\epsilon_\perp$ is the perpendicular component of the dielectric constant which depends on the temperature.

Figure 2:
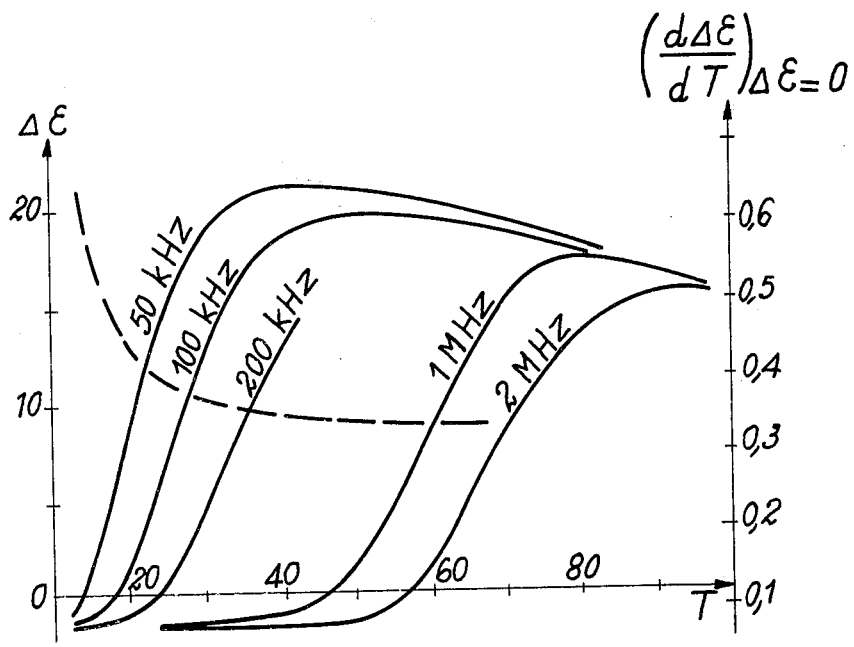
FIG. 2 is an experimental plot of the variations in dielectric anisotropy as a function of temperature in the particular case of the liquid crystal ABABN.

Experimental results obtained by the present Applicant are shown in FIG. 2 in the particular case of the liquid crystal ABABN (alkoxy-benzilidene-aminobenzonitrile). It can be noted in particular that, in the case of a frequency of 50 c/s, the experimental results are very close to the theoretical predictions shown in FIG. 1. FIG. 2 also gives the variation in gradient of the curves in respect of the particular value $\Delta\epsilon = 0$. These curves show:

a. that the gradient is such that a variation of approximately 1° C induces a variation in anisotropy of approximately 0.15, which permits a transition from an anisotropy equal to $-0.075$ to an anisotropy of $+0.075$, for example. This variation in anisotropy is sufficient to induce an optical effect in respect of an applied voltage of the order of 25 to 30 V;

b. as the frequency of the electric excitation field is lower, so the gradient in respect of $\Delta\epsilon = 0$ is of higher value. It can therefore be an advantage to operate at low frequency and at low voltage in the case of systems which have a low speed of control and at higher frequency (therefore at a higher voltage) in the case of systems which have more rapid control.

These physical phenomena and these results are applied in accordance with the invention to the control of the optical properties of a liquid crystal film in the following manner : the temperature and therefore the dielectric anisotropy of the liquid crystal are varied locally by supplying thermal energy and an electric field of predetermined frequency is applied in order to reveal these variations of anisotropy and to convert them into variations of state of the liquid crystal molecules. In the particular case of the phenomena which are illustrated in FIGS. 1 and 2, the electric field is also necessary in order to cause the variation in dielectric anisotropy to appear. If two values of dielectric anisotropy having opposite signs and sufficient amplitudes are thus obtained, said values can be represented by two distinct positions of the molecules which are usually parallel and perpendicular to the plates and it is found necessary to have recourse to controls of the digital type.

If continuously variable values of dielectric anisotropy are thus obtained, they can be represented by a continuous variation of the positions of the molecules between two end positions and it is found necessary to employ controls of the analog type.

In the following description, consideration will first be given to the digital methods.

A method of this type is illustrated in FIG. 3 in which the control device according to the invention is also shown very diagrammatically. In this figure, a liquid crystal film 10 is interposed between two walls 12 and 14 coated internally with conductive deposits 16 and 18 which perform the function of electrodes. These deposits are connected to a voltage source 20. The temperature of the liquid crystal film 10 is increased uniformly to a first value $T_1$ by heating means 22. At this temperature and in the case of the value of frequency of the applied electric field, the crystal possesses predetermined dielectric anisotropy. This accordingly results in a first uniform optical state of the entire film 10. In the method according to the invention, a supply of thermal energy indicated by the arrow 24 is effected locally in the liquid crystal film 10, for example in the zone designated by the reference 26. This has the effect of producing a local increase in the temperature of said film from the initial value $T_1$ to a second value $T_2$. The temperatures $T_1$ and $T_2$ are both within the range corresponding to a predetermined phase of the liquid crystal. Within the zone 26 which is heated to the temperature $T_2$, the liquid crystal is still subjected to the electric field obtained by means of the source 20 but its anisotropy assumes a second value which is different from the first in accordance with the explanation given earlier in connection with the previous figures 1 and 2. The zone 26 accordingly assumes a second optical state corresponding to this second value of anisotropy.

The very general device of FIG. 3 admits of at least three alternative forms according to the nature of the controlled optical states.

A device in accordance with a first alternative embodiment is illustrated in FIG. 4. This device is constituted by a liquid crystal cell intercalated between two electrodes 32 and 34 connected to a voltage source 36 of predetermined frequency. The means 38 serve to bring the film 30 up to an initial temperature $T_1$ such that the anisotropy is negative in respect of the value of frequency of the excitation field. The first optical state of the liquid crystal film 30 therefore corresponds to a first orientation of the molecules at right angles to the applied electric field or in other words parallel to the electrodes. The molecules which are oriented in this manner are represented diagrammatically by short line segments or dashes parallel to the electrodes 32 and 34. The supply of thermal energy represented schematically by the arrow 40 has the effect of increasing the temperature of the liquid crystal from the first value $T_1$ to a second value $T_2$ such that the anisotropy becomes positive, again in respect of the same value of frequency of the applied electric field. The second optical state of the liquid crystal within the excited zone is still transparent but corresponds to a molecular orientation parallel to the applied electric field or in other words at right angles to the electrodes; the optical indices of the two states are therefore different.

When the introduction of heat is discontinued in a device of this type, the temperature of the liquid crystal reverts to the initial value and the anisotropy again becomes negative. The applied electric field therefore again orients the molecules in a direction parallel to the electrodes and the liquid crystal is restored to its initial index.

Depending on the particular forms of construction of this first alternative embodiment, the liquid crystal employed can be of the cholesteric nematic type, for example, or may in some cases be of the smectic type. In the case of a twisted nematic structure and when the film is at the temperature $T_1$, the molecules located in planes parallel to the electrodes are parallel to a first direction in the vicinity of one of the electrodes and parallel to a second direction in the vicinity of the other electrode, the two directions being different and preferably perpendicular.

In the case of a cholesteric structure, the orientations of the cholesteric planes are different and preferably perpendicular in both states (temperature $T_1$ and temperature $T_2$ obtained by introduction of thermal energy).

In a second alternative embodiment of the device according to the invention, the device is operated in the dynamic scattering mode (DSM) in which light is scattered by a liquid crystal subjected to a low-frequency electric field. It is in fact known that a certain number of liquid crystals and especially the nematic crystals have a light-scattering effect above a certain threshold value of electric field, this effect being related to the appearance of turbulent movements within the liquid crystal. FIG. 5 is a schematic representation of the contrast C plotted as ordinates between scattering and non-scattering points as a function of the applied voltage plotted as abscissae which is usually a direct-current or low-frequency voltage. The variation in contrast as a function of the voltage shows the existence of a voltage threshold $V_S$ above which the light-scattering phenomenon occurs. In point of fact, this threshold is partially dependent on the value of anisotropy of the excited liquid crystal. FIG. 5 shows two curves $C_1$ and $C_2$ obtained in respect of two values of anisotropy of the liquid crystal. Two threshold voltages $V_S^1$ and $V_S^2$ correspond to these two values.

In this second alternative embodiment of the invention, the device is similar to that of FIG. 3 and the liquid crystal employed is of the type which exhibits said light-scattering phenomenon above a given threshold value. Two threshold voltages $V_S^1$ and $V_S^2$ therefore correspond to the two temperatures $T_1$ and $T_2$ to which the liquid crystal can be brought. A value V comprised between the two voltages $V_S^1$ and $V_S^2$ is accordingly chosen as the value of voltage delivered by the excitation source. Thus in the case of the temperature $T_1$, the applied voltage V is lower than the threshold voltage $V_S^1$ and the liquid crystal is transparent; in the case of the temperature $T_2$, the applied voltage becomes higher than the threshold voltage $V_S^2$ and light scattering can take place. In this alternative embodiment of the invention, there is therefore obtained an initial state of rest which is transparent and a second turbulent state which has a light-scattering effect.

Figure 6:
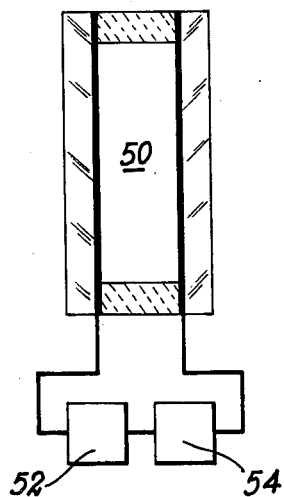
FIG. 6 is a schematic illustration of the device according to the invention which operates in the light-scattering mode by means of two voltage sources respectively at low frequency and high frequency, in conjunction with an explanatory diagram 6'.

In accordance with a form of construction which is slightly different from this alternative embodiment and which is illustrated in FIG. 6, the liquid crystal 50 is excited by an electric field which results from the application to the electrodes of a low-frequency voltage delivered by a generator 52 and of a high-frequency voltage delivered by a generator 54. In the first optical state, the molecules are for example and preferably parallel to the electrodes. This is obtained by adjusting the first value $T_1$ of the temperature, in which case th anisotropy is negative. The amplitude of the low-frequency voltage delivered by the source 52 is so adjusted as to ensure that the superposition of said low voltage on the high-frequency voltage at said temperature $T_1$ is lower than the threshold voltage $V_S$ above which the scattering effect appears. In point of fact, when a liquid crystal is excited by a low-frequency electric field and by a high-frequency field, it can be demonstrated that the equivalent voltage is of the form:

$$V_{BF}^2 + \alpha V_{HF}^2$$

where $\alpha$ is a coefficient, usually positive and a function of the dielectric anisotropy among others. The low-frequency voltage is therefore adjusted so as to have:

$$V_{BF}^2 + \alpha V_{HF}^2 \leq V_S^2$$

In accordance with results published for example in the article entitled "Hydrodynamic instabilities in nematic liquids under AC electric fields" in "Physical Review Letters", volume 25, No 24 of Dec. 14 th, 1970, the coefficient $\alpha$ falls to zero with the anisotropy. Under these conditions, if the temperature rise is such that the second value $T_2$ corresponds to a smaller or zero anisotropy of the liquid crystal 50, $\alpha$ is smaller or zero in this second state. The low-frequency applied voltage is then higher than the threshold value $\sqrt{V_S^2 - \alpha V_{HF}^2}$ and the scattering effect can then take place (see FIG. 6').

This second form of construction of the device, in the alternative embodiment which operates in DSM can be more advantageous is some cases than the first form of construction in which the variation in threshold voltage as a function of the anisotropy is fairly small and consequently results in a applied voltage of only slightly higher value than the threshold voltage in the second state, which would be liable in some cases to produce an insufficient contrast.

In a third alternative form of the device according to the invention, the effect of rotation of the planes of a cholesteric structure is utilized. The corresponding device is illustrated in FIG. 5. This device comprises a liquid crystal film 60 of the cholesteric type which is intercalated between two electrodes 62 and 64 connected to a voltage source 66 having a frequency F. The electrodes are preferably treated so as to ensure that the cholesteric crystal molecules are located in planes parallel to the electrodes. In the first state, the frequency F and the temperature $T_1$ are chosen so as to ensure that the dielectric anisotropy is zero. The second optical state is obtained by increasing the temperature from the value $T_1$ to a value $T_2$ such that the anisotropy becomes positive. The introduction of thermal energy is represented diagrammatically by the arrow 70. The molecules are then oriented perpendicularly to the electrodes as in the zone 68. This accordingly results in a structure which exhibits a periodic variation in refractive index, which behaves in the same manner as a grating and diffracts light.

When the introduction of thermal energy is discontinued, the temperature of the liquid crystal in the zone 68 reverts to the value $T_1$. Since the anisotropy becomes zero at this temperature, however, the orientation obtained in the second state is maintained, with the result that the device exhibits a considerable memory effect.

If it is desired to erase said second optical state in order to re-establish the transparent initial state in which the molecules are located in planes parallel to the electrodes, it is possible to apply to these latter and alternating-current voltage delivered by a source 52, the frequency F' of said voltage being such as to ensure negative anisotropy at the temperature $T_1$. Under the action of the electric field having a frequency F' which is thus produced, the molecules are accordingly oriented once again in a direction parallel to the plates.

Figure 8:
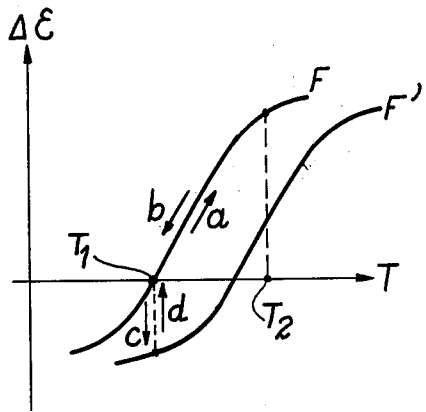
FIG. 8 shows diagrammatically a cycle of writing and erasing for the cholesteric liquid crystal cell of FIG. 7.

The complete cycle of conversions thus carried out is shown diagrammatically in FIG. 8. In this figure, the anisotropy $\Delta\epsilon$ is plotted as ordinates as a function of the temperature T which is plotted as abscissae. The initial state corresponds to the temperature $T_1$ and to the frequency F. The transition to the second state takes place at constant frequency be bringing the temperature from the value $T_1$ to the value $T_2$ (phase $a$). As soon as the introduction of heat is discontinued, the liquid crystal reverts to its temperature $T_1$ at constant frequency F and is restored to zero anisotropy (phase $b$). In order to initiate rotation of the molecules which will have the effect of restoring the liquid crystal to its first state, an excitation field having a frequency F' is utilized while maintaining the temperature at the value $T_1$, F' being chosen so as to endow the molecules with negative anisotropy (phase $c$). Since the molecules have re-oriented in planes parallel to the electrodes, the frequency F can again be employed at the temperature $T_1$, thus bringing the system back to its initial state (phase $d$).

Figure 7:
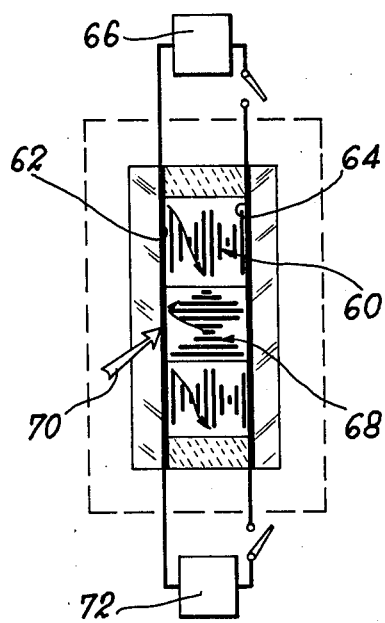
FIG. 7 shows an alternative embodiment of the device which operates with cholesteric liquid crystals.
Figure 6:
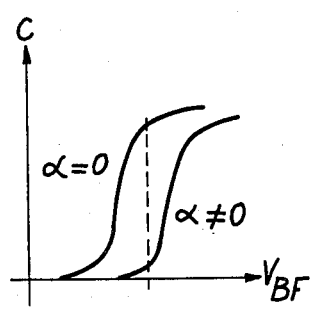

It should be noted that this cycle is not related solely to the device described in FIG. 7 and to the effect of rotation of the cholesteric liquid crystals but is applicable to all the devices in accordance with the invention.

In order to obtain a temperature $T_1$ corresponding to zero anisotropy, the liquid crystal cell can be thermostatically controlled.

Accordingly and as mentioned earlier, one of the advantages of the method of control according to the invention and of the corresponding devices lies in the possibility of adjusting the decay time, that is, the time taken by the liquid crystal to revert to its first optical state when the supply of thermal energy has been discontinued. This will now be explained in greater detail with reference to FIG. 9.

In the schematic representation of this figure, the curve of variation of the anisotropy $\Delta\epsilon$ is plotted as a function of the temperature T. The points A, B, C, D located on said curve represent a corresponding number of possible situations between which transitions can be effected as a result of variation of the temperature by means of the method according to the invention. In point of fact, depending on the respective situations of the points of departure and arrival, the time taken by the system to effect the corresponding transition is variable. In order to estimate this time, it is assumed that in the rest condition, the molecules are parallel to the walls (homogeneous or twisted structure) and that the dielectric anisotropy is positive in the presence of a low-frequency and high-temperature electric field (which corresponds to the point D).

It is known that, in the effect of collective molecular orientation under the action of an electric field, the transient behavior and more precisely the transition from any state of departure to a given state of arrival is characterized by a time constant T which, with respect to the time constant of natural decay $T_N$ of the liquid crystal, is given by an expression of the form:

$$T = \frac{V_S^2}{V^2 - V_S^2} \cdot T_N$$

where $V_S$ represents the threshold voltage which is dependent on the (positive) anisotropy $\Delta\epsilon$ in accordance with the law:

$$V_S = 2\pi \sqrt{\frac{\pi K_{11}}{\Delta\epsilon}}$$

where $K_{11}$ is an elastic constant of the liquid crystal and where V represents the applied voltage.

Figure 9:
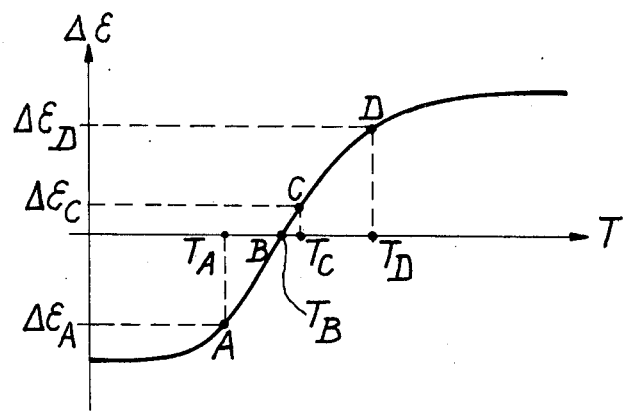
FIG. 9 shows a schematic curve of variations of the dielectric constant of a liquid crystal as a function of the temperature with the different operating points which are possible.

In point of fact, depending on the position of the point representing the initial state on the curve of FIG. 9, said decay time can assume very different values as may be confirmed by studying the three particular cases given hereunder:

1. The point A represents the initial state : the decay time $(T_D)_A$ which permits a return to said initial state has the value:

$$(T_D)_A = \frac{V_S^2}{-\frac{\Delta\epsilon_A}{\Delta\epsilon_D}V^2 - V_S^2} T_N$$

where $\Delta\epsilon_A$ and $\Delta\epsilon_D$ are the anisotropies at the points A and D.

2. In the case in which the point B corresponding to zero anisotropy corresponds to the initial state, the decay time $(T_D)_B$ assumes the value:

$$(T_D)_B = -T_N$$

Since the energy applied to the molecules is zero at point B, the molecules can have the same orientation as at point A, therefore an optical state of the same type, and the transition to point D in fact corresponds to a change of optical state.

3. When the initial state corresponds to point C, that is to say when the anisotropies of the initial and final states have the same sign, the decay time $(T_D)_C$ assumes the value:

$$(T_D)_C = \frac{V_S^2}{\frac{\Delta\epsilon_C}{\Delta\epsilon_D}V^2 - V_S^2} \cdot T_N$$

but, since the voltage V applied to the point C is lower than the threshold voltage corresponding to the dielectric anisotropy $\Delta\epsilon_C$, the liquid crystal molecules can have the same orientation as at point A, therefore an optical state of the same type, and the transition to point D in fact corresponds to a change of optical state.

It is therefore apparent that the decay time can be modified by changing the representative point of the initial state, that is to say in practice the first value given to the temperature. In particular, the decay time can be of long duration (hyperbolic decay) when $\Delta\epsilon_C$ comes close to $\Delta\epsilon_D V_S^2/V^2$. Conversely, this time duration can be very short when the absolute value of anisotropy at A is very high. This last-mentioned effect can be turned to profitable account in order to permit sequential writing of a complete page without any erasing of the first inscriptions.

In all cases, the rise time $T_M$ is given by the relation:

$$T_M = \frac{V_S^2}{V^2 - V_S^2} \cdot T_N$$

If $\Delta\epsilon_A$ is of high value, it is apparent that the decay time required to return to point A can be shorter than the rise time from point A.

Figure 10:
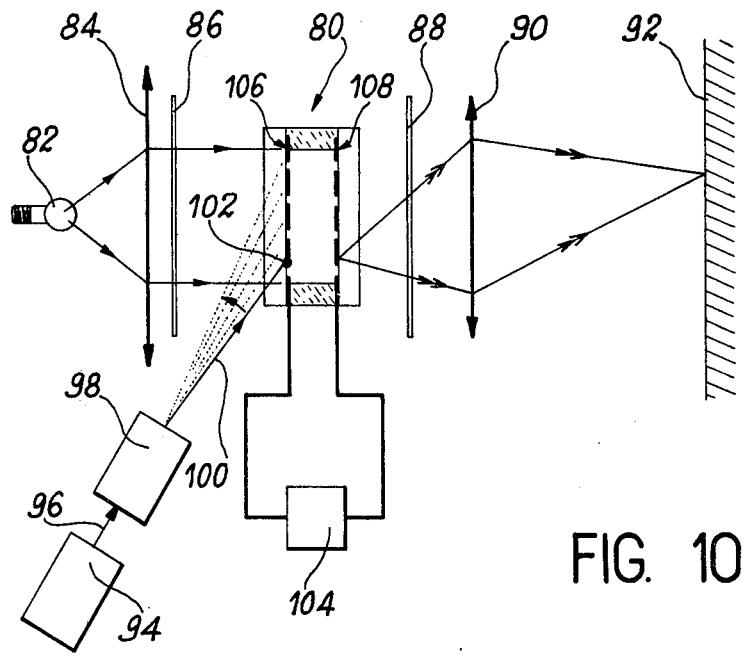
FIG. 10 illustrates the device according to the invention comprising an infrared laser, the beam of which can be directed to any point of the liquid crystal film.

FIG. 10 shows in greater detail a display device for carrying out the method of control according to the invention. This device comprises a liquid crystal cell 80, for example in accordance with the first alternative embodiment described earlier, a light source 82, a convergent optical system 84, a polarizer 86, an analyzer 88, a second convergent optical system 90 and a screen 92. The means for supplying thermal energy are constituted by a light source 94 which emits an infrared light beam 96; said beam passes through a deflection unit 98 which delivers a light beam 100 and this latter reaches the cell 80 at the point of impact 102. The light source 94 is advantageously a laser which emits in the infrared range, for example a laser of the yttrium-aluminum -garnet type (YAG laser) or a gallium arsenide laser or alternatively a helium-neon gas laser which emits in the infrared range. The light energy delivered by the laser is modulated in accordance with known methods in synchronism with the beam sweep control. The image which appears on the cell 80 is projected onto the screen 92. An adequate electric field supplied by an alternating-current voltage source 104 is applied to the liquid crystal by means of the electrodes 106 and 108 which are deposited on the faces.

Said electrodes are of material which is transparent or reflecting (on one of the faces) in the visible wavelengths and absorbent in the infrared range, e.g. indium oxide.

The modifications to be made in the method and the device according to the invention in order to adapt them to analog control of liquid crystal devices and especially imagers will now be briefly described.

Analog control consists on the one hand of addressing which permits excitation or non-excitation of the cell or which makes it possible to excite one of the points among the plurality of points constituting a liquid crystal device.

In accordance with the invention, addressing is always obtained by localized introduction of thermal energy in time or in space and is obtained by means of a modification and especially a change of sign of the dielectric anisotropy.

Analog control consists on the other hand in determining the optical state of the cell or of the thermally addressed point. This determination can also have a thermal character: in this case, the liquid crystal is continuously subjected to an electric field of constant frequency and amplitude. The quantity of thermal energy delivered and therefore the temperature attained makes it possible to modulate the extent of variation of dielectric anisotropy and therefore of variation of the optical state; it is possible for example to modulate the energy or the time of impact of a laser beam at the point concerned.

The determination mentioned above can be of another type, in which case the quantity of thermal energy delivered is always the same but the electric field is modulated in such a manner as to be synchronized with the delivery of thermal energy either in amplitude or in frequency in order that the optical effect should be modulated at constant dielectric anisotropy by producing a variation in excitation intensity or at constant excitation intensity by producing a variation in dielectric anisotropy.

This method of analog control in accordance with the invention can be applied in particular in black and white analog imagers or by making use of a polarizer-analyzer assembly in color imagers for television, for example.

We claim:

1. A method for controlling the optical properties of a liquid crystal film in which the value of dielectric anisotropy of the liquid crystal molecules is modified in order to control the optical state of said crystal, wherein:

there is chosen a liquid crystal in which said anisotropy depends on the temperature within a range in which the liquid crystal retains the same phase, an electric field of predetermined frequency is applied to the liquid crystal film, the temperature of the liquid crystal film is brought to a value located within said range, the dielectric anisotropy then assumes a predetermined value in respect of the value of said frequency and the liquid crystal film then assumes a predetermined optical state.

2. A method for controlling the optical properties of a liquid crystal film according to claim 1 in which the value of dielectric anisotropy of the liquid crystal molecules is modified in order to produce two different optical states of said crystal, wherein:

the temperature of the liquid crystal film is brought to a first value located within said range, whereupon the dielectric anisotropy assumes a first value in respect of the value of said frequency and the liquid crystal film accordingly assumes a first optical state, in order to produce a second optical state at least at certain points of the liquid crystal film, a second value is given to the dielectric anisotropy of the liquid crystal at said points in respect of the same frequency by making an introduction of thermal energy at said points which causes the temperature of the liquid crystal at said points to change from said first value to a second value which is still located within said range.

3. A method for controlling the optical properties of a liquid crystal film according to claim 1 in which the value of dielectric anisotropy of the liquid crystal molecules is modified in order to produce an optical state of said crystal, wherein:

an initial electric field of predetermined initial frequency and of pedetermined initial amplitude is applied to the liquid crystal film, the temperature of the liquid crystal film is brought to an initial value located within said range, whereupon the dielectric anisotropy assumes a predetermined value in respect of said value of said initial frequency and the liquid crystal film assumes a well-determined initial optical state in respect of said initial amplitude of the applied electric field, in order to produce at least at certain points of the liquid crystal film an optical state which is characteristic of each point, a value which is characteristic of each point aforesaid is given to the dielectric anisotropy of the liquid crystal at said points by making an introduction of thermal energy at said points which causes the temperature of the liquid crystal at said points to change from said initial value to another value which is characteristic of each point aforesaid and still located within said range.

4. A method of control according to claim 3, wherein the frequency of the applied electric field is modified at least at certain points of the liquid crystal film.

5. A method according to claim 2, wherein the effect of collective molecular orientation of a liquid crystal under the action of a suitable electric field is utilized in order to obtain two different optical states, and wherein:

the first value of temperature is chosen so as to ensure that the anisotropy is of a first sign at the frequency of the applied electric field, the first optical state of the liquid crystal film being transparent and such as to correspond to a first orientation of the molecules at right angles to the applied electric field, the second value of temperature is chosen so as to ensure that the anisotropy is of opposite sign again in respect of the same frequency of the applied electric field, the second optical state of the liquid crystal at the point which is brought to said second temperature being again transparent but such as to correspond to a second molecular orientation parallel to the applied electric field.

6. A method according to claim 2, wherein the effect of dynamic light scattering by a liquid crystal under the action of a suitable low-frequency electric field is utilized in order to obtain either a transparent state or a light-scattering state and wherein:

there is chosen a liquid crystal which exhibits said light-scattering effect above a predetermined excitation electric field threshold, said liquid crystal being such that the value of said threshold is dependent on the value of anisotropy of the liquid crystal, the first and the second temperatures being thus intended to correspond to a first and to a second threshold value, a value between said two first and second threshold values is chosen as the applied field value.

7. A method according to claim 2, wherein the effect of dynamic light scattering by a liquid crystal under the action of an electric field resulting from the superposition of a low-frequency field and a high-frequency field is utilized in order to obtain either a transparent state or a light-scattering state and wherein:

there is chosen a liquid crystal which exhibits said light-scattering effect above a predetermined excitation field threshold, said liquid crystal being such that the value of said threshold is dependent on the value of anisotropy of the liquid crystal, the value of the frequency of the high-frequency field is chosen so as to give the liquid crystal an anisotropy having a pedetermined value in respect of said first value of temperature, the value chosen for the low-frequency field is such that, at said first value of temperature, the superposition of the low-frequency field and of the high-frequency field is equal at a maximum to the threshold of the light-scattering effect, the second value of temperature is chosen so as to give a value to the anisotropy which, at absolute value, is lower than said value under said conditions of frequency.

8. A method according to claim 2, wherein the effect of rotation of the planes of a cholesteric liquid crystal is utilized and wherein:

the first value of temperature and of said frequency are chosen so as to ensure that the anisotropy is of a first sign or zero, the molecules of the cholesteric liquid crystal in the first state being accordingly located in planes which have a first orientation with respect to the electric field, the second temperature is chosen so as to ensure that the anisotropy is of a second sign at said frequency, the molecules of the cholesteric liquid crystal in the second state being such as to have an orientation perpendicular to the first with respect to the electric field.

9. A method of display according to claim 1, wherein the introduction of thermal energy which is necessary for the writing operation is carried out by addressing an infrared light beam onto said points of the liquid crystal film.

10. A liquid crystal device for carrying out the method according to claim 1, comprising a liquid crystal film intercalated between a system of electrodes placed on two flat walls and means for varying the dielectric anisotropy of the liquid crystal molecules at least at certain points in order to cause said liquid crystal to assume a characteristic optical state at said points, wherein:

the liquid crystal employed is of the type in which the dielectric anisotropy at constant frequency is dependent on the temperature within a given range in which the liquid crystal retains the same phase, said means comprise:

a. an alternating-current voltage source of predetermined frequency which is connected to all the systems of electrodes, b. means for bringing the temperature of said liquid crystal film to an initial value located within said range, the film subjected to said electric field being in that case in an initial optical state, c. means for selectively addressing at selected points of the liquid crystal film a predetermined thermal energy which is characteristic of each point aforementioned and increases the temperature of the liquid crystal at said points from said initial value to a second value which is characteristic of each point aforementioned, said points of the liquid crystal being then in a second optical state which is characteristic of each point aforementioned.

11. A liquid crystal imager, wherein said imager comprises the device of claim 10 and wherein the means for introduction of thermal energy are constituted by a light source which emits an infrared beam directed towards the liquid crystal film and associated with means for deflecting said beam which are capable of addressing said beam over the entire surface of the liquid crystal film.

12. An imager for carrying out the method of claim 8, wherein said imager comprises:

a cholesteric liquid crystal device, means for introducing thermal energy constituted by a light source for emitting an infrared beam directed towards the liquid crystal film and associated with means for deflecting said beam which are capable of addressing said beam at any point of the surface of the liquid crystal film, means for erasing and comprising an alternating-current voltage source having a frequency such that the anisotropy is of said first sign at said first value of temperature and means for connecting the electrodes corresponding to the points to be erased to said source.

13. An imager according to claim 11, wherein said source is a laser which emits in the infrared range.

14. An imager according to claim 13, wherein said electrodes are of material which is transparent in the visible wavelengths and absorbent in the infrared range.

15. A method according to claim 1, for displaying binary information on a liquid crystal film, comprising the steps of:

bringing the temperature of the liquid crystal film to a first value located within said range, whereupon the dielectric anisotropy assume a first value in respect of the value of said frequency and the liquid crystal film accordingly assumes a first optical state, making an introduction of thermal energy at the points of said film where a second optical state is to be produced, said introduction causing the temperature of the liquid crystal at said points to change from said first value to a second value which is still located within said range and causing the dielectric anisotropy of the liquid crystal at said points at said frequency to change from said first value to a second value corresponding to said second optical state, erasing said second optical state by discontinuing the introduction of thermal energy, whereupon the temperature of the liquid crystal at said points reverts to said first value and the optical state to said first state.

16. A method according to claim 15, wherein the time required for erasing is adjusted by modifying the value of said first and second temperatures.

17. A method according to claim 1 for displaying binary information comprising the steps of:

choosing a cholesteric liquid crystal film, bringing the temperature of the cholesteric film to a first value where the anisotropy is of a first sign and also zero, the molecules of the cholesteric liquid crystal being in a first state located in planes which have a first orientation with respect to the electric fields, making an introduction of thermal energy at the points of said film where a second optical state is to be produced, said introduction causing the temperature of the cholesteric crystal at said points to change from said first value to a second value, which is still located within said range, choosing said second value of temperature so as to ensure that the anisotropy is of a second sign at said frequency, the molecules of the cholesteric liquid crystal being in a second state where their orientation is perpendicular to said first orientation, erasing said second optical state by discontinuing the introduction of thermal energy, whereupon the temperature of the liquid crystal reverts to its first value and by applying to said liquid crystal an electric field having a frequency such that the anisotropy is of said first sign at said first value of temperature.

* * * * *